(12) United States Patent
St. Cyr (10) Patent No.: US 12,368,919 B1
(45) Date of Patent: Jul. 22, 2025

(54) INTERACTIVE TELEVISION SYSTEM AND METHOD INCLUDING SUPPLEMENTAL CONTENT

(71) Applicant: DYMAXION LLC, Highland Mills, NY (US)

(72) Inventor: Brian St. Cyr, Highland Mills, NY (US)

(73) Assignee: DYMAXION, LLC, Highland Mills, NY (US)

(*) Notice: Subject to any disclaimer, the term of this patent is extended or adjusted under 35 U.S.C. 154(b) by 71 days.

(21) Appl. No.: 18/446,650

(22) Filed: Aug. 9, 2023

Related U.S. Application Data (60) Provisional application No. 63/396,350, filed on Aug. 9, 2022.

(51) Int. Cl.
*H04N 21/431* (2011.01)
*H04N 21/237* (2011.01)
*H04N 21/435* (2011.01)

(52) U.S. Cl.
CPC ....... *H04N 21/4316* (2013.01); *H04N 21/237* (2013.01); *H04N 21/435* (2013.01)

(58) Field of Classification Search
CPC .................................................. H04N 21/4316
See application file for complete search history.

(56) References Cited

U.S. PATENT DOCUMENTS

| | | | |
|---|---|---|---|
| 8,484,313 B2 | 7/2013 | Hines | |
| 10,552,475 B1 | 2/2020 | Cox | |
| 10,575,063 B2 | 2/2020 | Casagrande et al. | |
| 10,595,064 B2 | 3/2020 | Yamagishi et al. | |
| 10,666,549 B2 | 5/2020 | Oh et al. | |
| 2003/0007096 A1* | 1/2003 | Katayama | H04N 21/426 348/E5.006 |
| 2009/0300480 A1 | 12/2009 | Cohen et al. | |
| 2013/0042262 A1 | 2/2013 | Riethmueller | |

OTHER PUBLICATIONS

No Author. "ATSC Technology Group Report: Caption Carriage in E-VSB and with New Codecs." Advanced Television Systems Committee. www.atsc.org. Washington, DC. Dec. 14, 2005. 23 pages.
No Author. "Digital Television (DTV) Closed Captioning ANSI/CTA-708-E R-2018, Aug. 2013." Consumer Technology Association. www.cta.tech. 2018. 118 pages.
No Author. "The Basics of 608 vs. 708 Captions." Aberdeen Broadcast Services. Rancho Santa Margarita, CA. https://aberdeen.io/blog/2009/06/18/the-basics-of-608-vs-708-captions/ retrieved on May 18, 2022. 4 pages.

* cited by examiner

*Primary Examiner* — Michael H Hong
(74) *Attorney, Agent, or Firm* — Leason Ellis LLP (57) ABSTRACT

The present disclosure provides technical solutions for effective systems and methods to present supplemental content in a primary video stream, without changing the format of the video stream. Data fields within existing closed captioning standards are exploited to enable presentation of supplemental content to a viewer. This is independent of the main closed captioning system, so that a viewer can still display the main captioning text, including the captioning text corresponding to the language of the video stream itself.

20 Claims, 5 Drawing Sheets

INTERACTIVE TELEVISION SYSTEM AND METHOD INCLUDING SUPPLEMENTAL CONTENT

RELATED APPLICATIONS

The present application claims priority to U.S. Provisional Patent Application Ser. No. 63/396,350, filed Aug. 9, 2022, which is incorporated by reference in its entirety.

FIELD OF THE INVENTION

The present description relates generally to providing content to viewers.

BACKGROUND

There have been various implementations of interactive television to enhance the viewer experience. For example, viewers can participate in a live broadcast by visiting a specified web page or using a mobile application on a smartphone or tablet computer managed by the content provider, such as voting for contestants. In addition, web page addresses are often displayed in a television program or advertisement to encourage viewers to enter that address on a web browser and visit that page. More recently, barcodes or matrix barcodes (e.g., QR codes) are displayed on screen, allowing a user to scan that code with a separate device to visit a web address on that separate device.

Separately, within television broadcasts, including modern digital television broadcasts following the standards of the United Stated Federal Communications Commission (FCC) and the Advanced Television Systems Committee (ATSC), contain closed captioning, which generally refers to text displayed onscreen representative of spoken words and sounds in the video content. Closed captioning text was initially developed for the hearing-impaired, and it is also useful for muted viewing such as in bars, gyms and libraries. Regulatory agencies in the United States and other countries require captions in most conventional television broadcasting.

The closed-caption stream is conventionally transmitted according to one or more standards for providing closed caption content. Prior to the emergence of high-definition television, analog television signals following the standards of National Television Systems Committee (NTSC), implemented closed-caption content using the Consumer Technology Association CTA Standard CTA-608 (also known as EIA-608 (where "EIA" refers to the Electronic Industries Alliance), CEA-608 (where "CEA" refers to the Consumer Electronics Association), "line 21 captions"). Text from captions is translated to data and embedded in the analog video signal, typically within the vertical blanking intervals at a predefined line (line 21). Within this predefined line, there is a field that includes the captioning text, for instance, in the same language of the video stream. In addition, an additional field was provided in the standards that was set aside for alternative closed captioning text, intended for provision of captioning in a language alternative to that of the audio-video broadcast. This additional caption field is also known as "line 21, field 2 captions" and "line 284".

In the ATSC standards for digital television, the technical implementation of the closed captioning data is different than the NTSC standard, referred to as Digital Television Closed Captioning (DTVCC). The established digital broadcast standard for this is CTA-708 (also known as EIA-708 and CEA-708). Rather than embedding data in the analog video signal, in the DTVCC systems, the closed captioning signal is formatted and added to vertical ancillary data as a digital bitstream within the broadcast. In standard implementations, DTVCC CTA-708 data (and optionally CTA-608 data that is upconverted) is embedded in the MPEG (e.g., MPEG-2) video streams in the picture user data. The DTVCC Transport Stream is used where packets are in picture order and are rearranged with the main picture frames. This is implemented as a fixed-bandwidth channel with is space allocated for both CTA-608 line 21 captions and DTVCC, with 960 bit/s allocated for backwards compatibility with CTA-608 line 21 captions and 8640 bit/s allocated for DTVCC CTA-708 captions.

In addition to the main closed captioning text, the DTVCC format also includes an additional field for closed captioning text, and includes data equivalent to field 2 data as in the CTA-608 standards. In the DTVCC format, secondary caption fields are also included for the ability to caption in multiple languages.

In the historical and current closed captioning formats, it was required that the closed captioning signal remain unchanged. In typical broadcast, the video itself can be transmitted in first format, and reformatted at a sub-station or at the user side. For example, in digital television, a significant change in the signal is in the compression. However, one aspect that has remained the same is that the closed captioning signal is co-transmitted with the video content in a format that is agnostic of the video format. Any transcoding of the video content is required to maintain the closed captioning.

However, for the most part any secondary fields in captioning systems remain widely unused in the industry. While the primary captions have been mandated for many broadcasts, the secondary captions have not. As a result, these fields are carried and maintained in the protocols, but largely remain unused.

It is in regard to these and other problems in the art that the present disclosure is directed to provide a technical solution for an effective system and method presenting supplemental content in a primary video stream.

SUMMARY OF THE DISCLOSURE

A method for interactive viewing, a computer storage medium encoded with a computer program comprising instructions that when executed by at least one computing device cause the at least one computing device to perform operations for providing an interactive viewing session to a user computing device, and a computer-implemented system for providing an interactive viewing session to a user computing device are provided herein. A user computing device is provided including at least a display, a secondary closed captioning decoding module, and network connectivity. Broadcasted video content and associated closed captioning data is received at the user computing device. Closed captioning data includes a secondary captioning field, and a supplemental content code that is associated with the broadcasted video content is encoded in the secondary captioning field. The supplemental content code is decoded with the secondary closed captioning decoding module. The decoded supplemental content code is transmitted via network connectivity to a supplemental content server, which receives the supplemental content code, identifies supplemental content associated with the supplemental content code, and transmits the supplemental content to the user computing device via network connectivity. The supplemental content or a link to the supplemental content is presented on the display of the user computing device.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

The present disclosure provides technical solutions for effective systems and methods to present supplemental content in a primary video stream, without changing the format of the video stream. Data fields within existing closed captioning standards are exploited to enable presentation of supplemental content to a viewer. This is independent of the main closed captioning system, so that a viewer can still display the main captioning text, including the captioning text corresponding to the language of the video stream itself. The processes and systems herein utilize the existence secondary fields in captioning systems. In certain embodiments the processes and systems herein do not require that the primary captioning data (which is intended to be viewed and read) have symbols added. In certain embodiments the processes and systems herein do not require that a parsing system have the functionality to recognize and differentiate a set of information that contains codes with information available for display, and those that do not.

Figure 1:
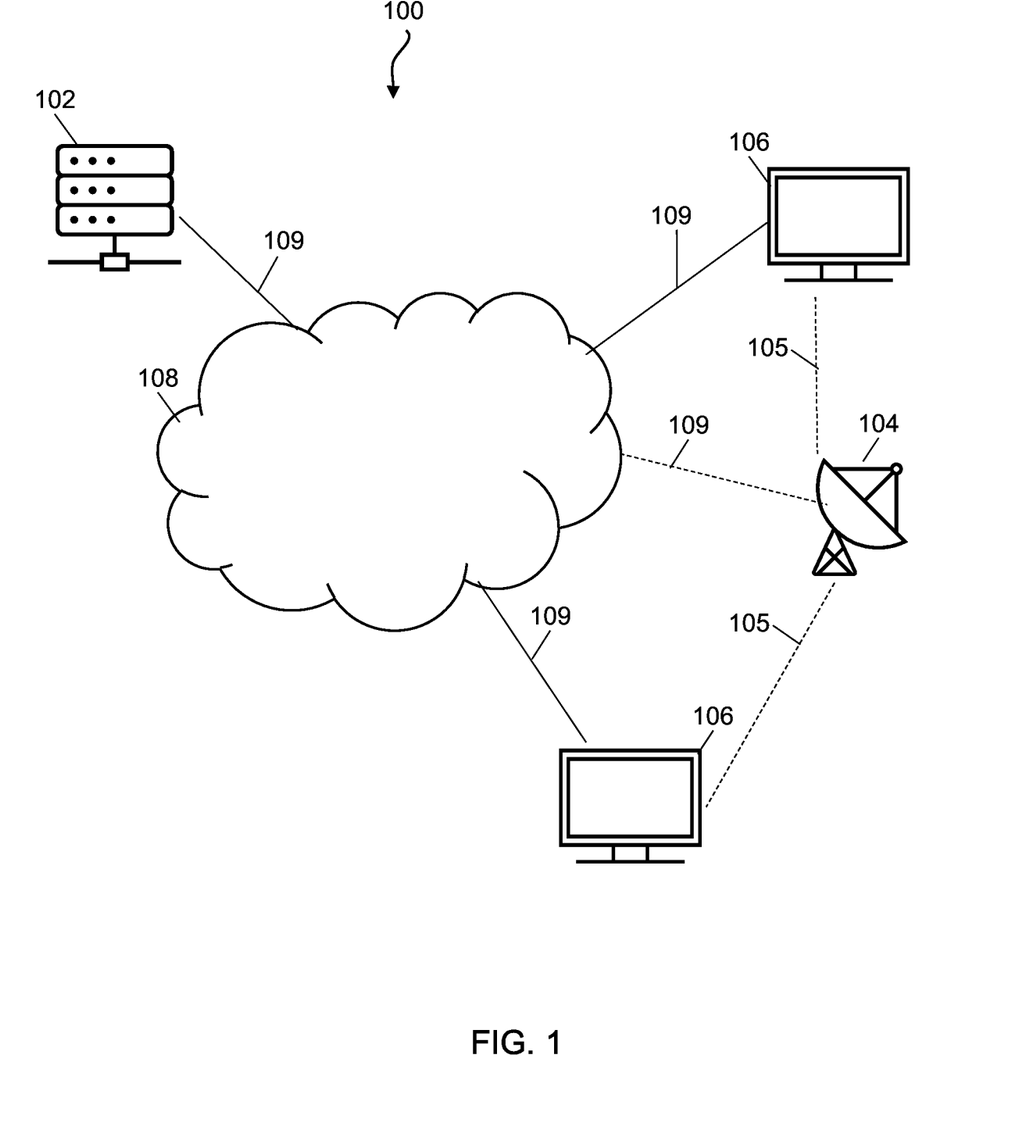
FIG. 1 is an overview schematic diagram illustrating embodiments herein.

Referring to FIG. 1, a diagram is provided of an example arrangement that operates for providing the systems and methods disclosed herein, designated generally as system 100. System 100 can include one or more supplemental content servers 102 (SCS(s) 102), one or more content distribution servers 104 (CDS(s) 104) and one or more user computing devices 106 (UCD(s) 106). One or more UCDs 106 are communicatively coupled 109 to SCS 102 across a communication network 108, for transmission of requests from UCD 106 to SCS 102, and for transmission of supplemental content from SCS 102 to UCD 106. In addition, the one or more UCDs 106 are communicatively coupled 105 and/or 109 to CDS 104 for transmission of content to the UCDs 106 and receiving requests from UCD 106. In one or more implementations, one or more UCDs 106 are communicatively coupled to CDS 104 via a video content network, shown as link 105. In one or more implementations, one or more UCDs 106 are communicatively coupled to CDS 104 via network 108 (shown as link 109). In certain embodiments, data on the SCS 102 has no interaction with the CDS 104. In certain embodiments, the SCS 102 can detect an IP address of any UCD 106 that has installed and/or enabled therein a captioning secondary closed captioning decoding module and a supplemental content module, as described herein. In addition, CDS 104 can optionally be communicatively coupled to the SCS 102 directly (not shown) or via the network 108.

SCS 102 is configured to transmit and receive data over the network 108. SCS 102 can be configured to access supplemental content within one or more content databases for the present disclosure, and to transmit supplemental content to one or more UCDs 106 when a corresponding supplemental content code is encountered by a closed captioning decoding module within the UCD 106. In addition, SCS 102 can be configured to access Internet websites and other online content. It is contemplated that SCS 102 can access any required databases via communication network 108 or any other communication network to which SCS 102 has access. SCS 102 can communicate with devices including those that comprise databases, using any known network communication method, including Ethernet, direct serial, parallel, universal serial bus ("USB") interface, and/or via wired or wireless local or wide area network. SCS 102 is described as being implemented on a single server or computer system, but it is contemplated that the functions of SCS 102 can be distributed across multiple servers, or duplicated in multiple servers, with all or any portion thereof maintained in a sever infrastructure also known as a data center, or in multiple data centers working in tandem, also known as a cloud environment.

Supplemental content comprises one or more of: a video stream stored at the supplemental content server; statistical data stored at the supplemental content server; a resource on an external webpage identified by a URL; an interactive voting or polling interface; a gaming interface; a wagering interface; an additional informational interface; and/or a shopping interface concerning products or services for purchase.

Figure 2:
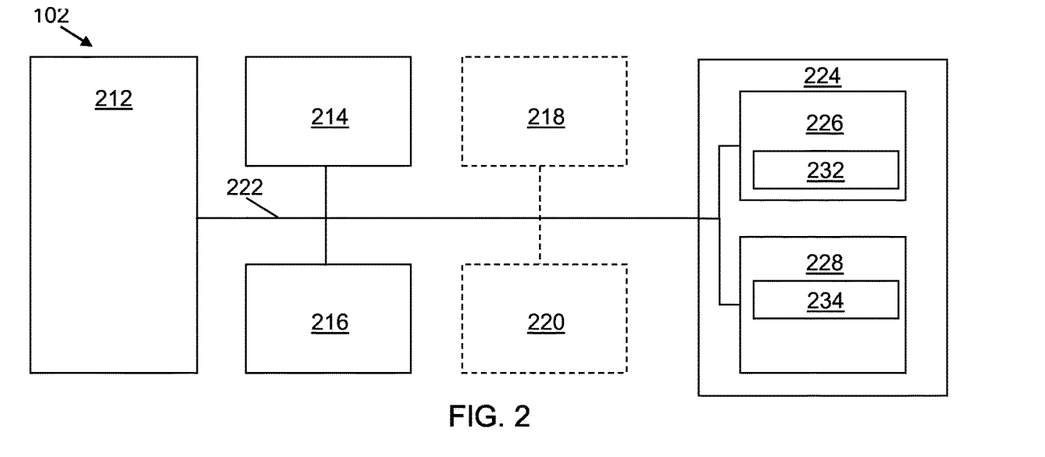
FIGS. 2-4 are block diagrams of components in embodiments herein.

With reference to FIG. 2, an exemplary block diagram is depicted of a SCS 102 in which one embodiment of the present disclosure can be implemented. SCS 102 can be implemented generally as shown, or the elements described with respect to FIG. 2 can be considered as a functional description of the various features which may be present in one or more servers for handling supplemental content. As is known by those of ordinary skill in the art, items shown separately can be combined, and some items shown as integrated can be separated. In general, SCS 102 includes one or more processors 212 such as one or more central processing units (CPUs), an input/output interface 214 and support circuitry 216. In certain embodiments, where the data processing apparatus 102 requires a direct human interface, a display 218 and/or an input device 220 such as a keyboard, mouse, pointer, motion sensor, microphone and/or camera are also provided (indicated as optional in FIG. 2 with dashed lines). Note that while SCS 102 is depicted with direct human interface components display 216 and/or input device 218, programming of modules and exportation of data can alternatively be accomplished over the input/output interface 212, for instance, where the SCS 102 is connected to network 108 and the programming and display operations occur on another associated computer or via a detachable input device. The processor 212, input/output interface 214, support circuitry 216, and the optional display 218 and/or input device 220, are shown connected to a bus 222 which also connects to a computer-readable medium 224, referred to herein as memory 224. Memory 224 generally includes program storage memory 226 and data storage memory 228. Program storage memory 226 and data storage memory 228 can each comprise volatile (RAM) and non-volatile (ROM) memory units and can also comprise hard disk and backup storage capacity, and both program storage memory 226 and data storage memory 228 can be embodied in a single memory device or separated in plural memory devices.

Program storage memory 226 stores at least software program modules with instructions for execution by the one or more processors, and associated data, including one or more of an operating system and a content request processing module 232. The operating system generally includes procedures for managing one or more of memory, processes, software, hardware and/or network connections. Content request processing module 232 generally includes one or more software programs containing instructions stored in at least non-volatile memory of memory 224 including program storage memory 226, to receive the data transmitted from the UCDs 106, including a request for supplemental content when one or more corresponding supplemental content code(s) is/are encountered by a closed captioning decoding module within a UCD 106 in a secondary closed captioning field as in the present disclosure; selects one or more content files and/or links associated with the received supplemental content code(s); and transmits the selected content file(s) and/or link(s) to the UCD 106.

Data storage memory 228 stores at least one or more supplemental content databases 234 that contains, stored in at least non-volatile memory of memory 224 including data storage memory 228, one or more of: web pages; image files; video content; documents; audio/video recordings; links to web pages, image files, video content, documents and/or audio/video recordings; metadata or other related information. The supplemental content database 234 also stores the supplemental content code(s) that are transmitted in a secondary closed captioning field as in the present disclosure. In certain embodiments (not shown in FIG. 2), data storage memory 228 contained one or more databases containing, stored in at least non-volatile memory of memory 224 including data storage memory 228, information concerning each UCD 106 including identification information (e.g., one or more of Internet Protocol (IP) address, Media Access Control (MAC) address, username) and optionally other information such as credentials (e.g., password or biometric credentials), client-provided feedback, historical viewing information (such as what supplemental content was viewed, when options to view supplemental content was presented, when a user opted out of viewing supplemental content, when a user viewed supplemental content, how long the user viewed the supplemental content), user-selected permissions, user data for financial transactions (such as banking or credit card information for purchasing of goods and/or services, wagers, donations or other payments) and other data.

Each of the modules or programs corresponds to a set of instructions for performing a function described above. The set of instructions can be executed by one or more processors (e.g., the processors 212). The above identified modules or programs stored in at least non-volatile memory of memory 224 can be implemented as separate software programs, procedures or modules, or various subsets of the modules can be combined or otherwise rearranged in various implementations. In some implementations, memory 224 stores a subset of the modules and data structures identified above. Furthermore, memory 224 can store additional modules and data structures, including one or more network communication modules, database management systems, and other supporting modules not described above. In certain embodiments, additional modules and data structures are presented to perform financial transactions, including purchase of goods and/or services, wagers, donations or other payments. In certain embodiments, additional modules and data structures are presented to broadcast detection. For example, detection of viewership of content containing secondary closed captioning encoded as described herein can be carried out by instructions executed at the SCS 102 communicatively coupled to a UCD 106, by encoding secondary closed captioning code "A" with a program "B" airing at a time and date "C"; the SCS 102 detects an IP address of the UCD 106, and compares a broadcaster's media schedule for program "B." Then the program "B" airs at time and date "C", a secondary closed captioning decoding module on the UCD 106 detects the secondary closed captioning code "A." The SCS 102 receives verification of the detection of the secondary closed captioning code "A" for the particular UCD 106 at time and date "C", for instance identified by the IP address, thus verifying the broadcast took place. Alternatively, if program "B" is viewed at a later time than the time and date "C", for instance by viewing a recorded version of the program, a later time stamp will be transmitted to the SCS 102.

CDS 104 is configured to transmit and receive data over the network 108 and/or via other means. In certain implementations CDS 104 is configured to disseminate video streams by cable lines, satellite transmissions, radio transmissions or cellular transmissions via a video content network 105. In certain embodiments CDS 104 is configured to transmit and receive data over the network 108. In certain embodiments CDS 104 is configured to transmit and receive data over the network 108 and/or by cable lines, satellite transmissions, radio transmissions or cellular transmissions via a video content network 105. In certain embodiments, CDS 104 is hosted or managed by an over the air broadcast provider, a cable or satellite television service provider, or a streaming video content provider. Generally, CDS 104 includes a transmission interface to transmit video streams, wherein the transmitted video includes supplemental content code(s) in a secondary closed captioning field. In general, CDS 104 can access video streams from various sources, such as a television networks and/or content licensed directly by the operator of the CDS 104. It is contemplated that CDS 104 can access any required video content to which it has access. CDS 104 can communicate with the UCD 106 using any known communication method, including but not limited to cable television inputs, satellite receivers, from a network connection (e.g., an Internet connection such as a television streaming service) or from an over-the-air antenna. CDS 104 is described as being implemented on a single server or computer system, but it is contemplated that the functions of CDS 104 can be distributed across multiple servers, or duplicated in multiple servers, with all or any portion thereof maintained in a sever infrastructure also known as a data center, or in multiple data centers working in tandem, also known as a cloud environment. Further, in some implementations, the functionality of CDS 104 and SCS 102 can be combined on a single computer system or single distributed computer system, with all or any portion thereof maintained in a sever infrastructure, also known as a data center, or multiple data centers working in tandem also known as a cloud environment.

Figure 3:
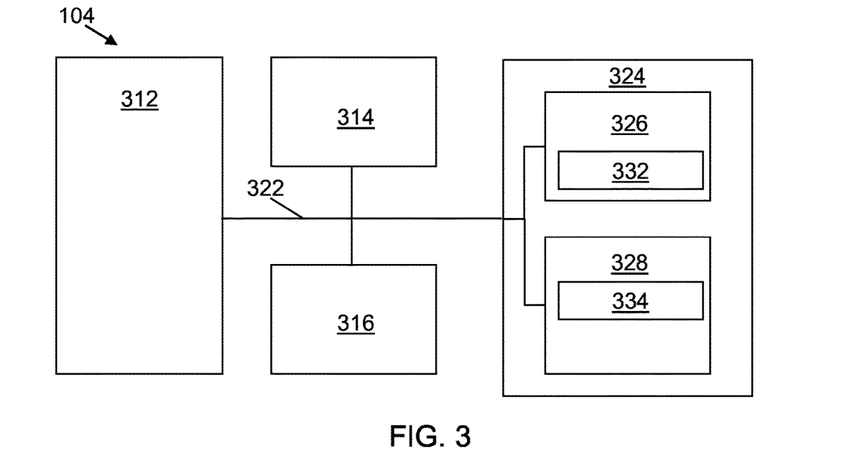

With reference to FIG. 3, an exemplary block diagram is depicted of a CDS 104 in which one embodiment of the present disclosure can be implemented. CDS 104 can be implemented generally as shown, or the elements described with respect to FIG. 3 can be considered as a functional description of the various features which may be present in one or more servers for handling video content distribution.

As is known by those of ordinary skill in the art, items shown separately can be combined, and some items shown as integrated can be separated. In general, CDS 104 includes one or more processors 312 such as one or more central processing units (CPUs), an input/output interface 314 and support circuitry 316. The processor 312, input/output interface 314 and support circuitry 316 are shown connected to a bus 322 which also connects to a computer-readable medium 324, referred to herein as memory 324. Memory 324 generally includes program storage memory 326 and data storage memory 328. Program storage memory 326 and data storage memory 328 can each comprise volatile (RAM) and non-volatile (ROM) memory units and can also comprise hard disk and backup storage capacity, and both program storage memory 326 and data storage memory 328 can be embodied in a single memory device or separated in plural memory devices.

Program storage memory 326 stores at least software program modules with instructions for execution by the one or more processors, and associated data, including one or more of an operating system and a content distribution module 332. The operating system generally includes procedures for managing one or more of memory, processes, software, hardware and/or network connections. Content distribution module 332 generally includes one or more software programs containing instructions stored in at least non-volatile memory of memory 324 including program storage memory 326, to send video streams to UCDs 106, wherein the video streams include embedded therein supplemental content code(s) in a secondary closed captioning field, the supplemental content code(s) being readable by a secondary closed captioning decoding module within a UCD 106.

Data storage memory 328 stores at least one or more content databases 334 that contains, stored in at least non-volatile memory of memory 324 including data storage memory 328, video content and closed captions associated with the video content, including supplemental content code(s) in a secondary closed captioning field. The video content can be the primary content that is consumed by viewers, and can include broadcast streaming content, e.g., typical programming on selected channels that is broadcast to all viewers simultaneously, and/or on-demand content that is selected by individual viewers. In certain embodiments (not shown in FIG. 3), data storage memory 328 also contains one or more databases containing, stored in at least non-volatile memory of memory 324 including data storage memory 328, information concerning each UCD 106 including identification information (e.g., one or more of Internet Protocol (IP) address, Media Access Control (MAC) address, username) and optionally other information such as credentials (e.g., password or biometric credentials), and historical viewing information (such as what primary content was viewed).

Each of the modules or programs corresponds to a set of instructions for performing a function described above. The set of instructions can be executed by one or more processors (e.g., the processors 312). The above identified modules or programs stored in at least non-volatile memory of memory 324 can be implemented as separate software programs, procedures or modules, or various subsets of the modules can be combined or otherwise rearranged in various implementations. In some implementations, memory 324 stores a subset of the modules and data structures identified above. Furthermore, memory 324 can store additional modules and data structures, including one or more network communication modules, database management systems, and other supporting modules not described above.

Figure 4:
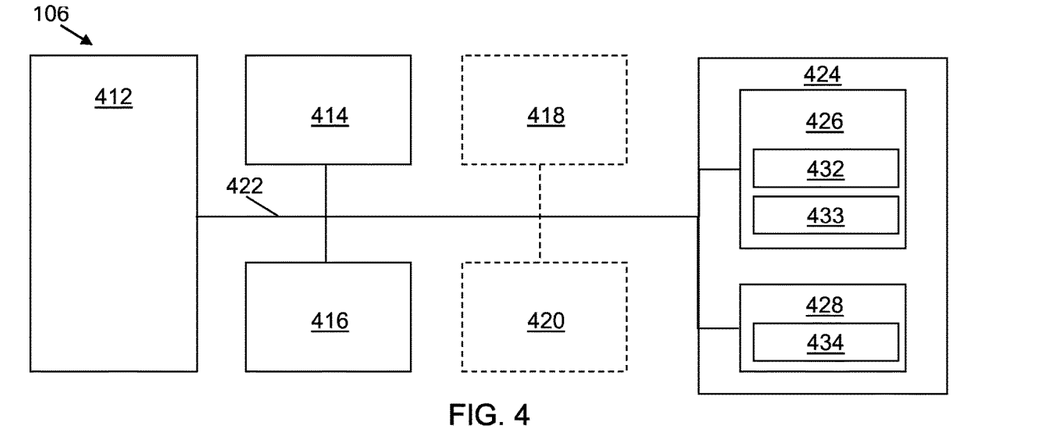

UCD 106 is configured to transmit and receive data over the network 108. UCD 106 is configured to receive video content from CDS 104, including secondary closed captioning data. UCD 106 is also configured to transmit requests to SCS 102, and to receive supplemental content transmitted from SCS 102. In addition, UCD 106 can be configured to access Internet websites and other online content. UCD 106 can communicate with devices using any known network communication method, for example including Ethernet, direct serial, parallel, USB interface, and/or via wired or wireless local or wide area network. UCD 106 is described as being implemented on a single computer, but it is contemplated that the functions of UCD 106 can be distributed across multiple computers. In general, each UCD 106 is equipped with software applications and/or other software and/or hardware tools to output received data in a suitable user format (audio and/or visual content of said received data). By way of example, UCD 106 may be a television having an integrated computer system that provides processing, input/output (including network connectivity) and data storage associated with the video and/or audio outputs, commonly referred to as "smart televisions." In certain embodiments, UCD 106 comprises a single device video display having coupled thereto an add-on streaming device, for example, a Roku, Fire TV and/or Chromecast, wherein a secondary closed captioning decoding module 432 and/or a supplemental content module 433 described herein are stored in at least non-volatile memory of memory 424 including data storage memory 428. In implementations herein, each UCD 106 includes a secondary closed captioning decoding module 432 and a supplemental content module 433.

The user computing device can be any computing device, hardware, firmware, or software that can transmit or receive video and/or audio-video signals, data packets, instruction signals, data signals or any form of information-containing signals over a communication link. The hardware, firmware, or software can include, for example, a video display or television with an integrated computer (e.g., a "smart television"), a smart phone, a personal data assistant (PDA), a smart watch, a tablet, a computer, or the like, without limitation. The UCD can be portable or stationary. In implementations of the present disclosure, the UCD is an interactive television that includes a computer and/or a computer readable medium that enables a viewer to view content from a content distribution server and interactively select supplemental content for viewing based on encoding in secondary closed captioning data.

With reference to FIG. 4, an exemplary block diagram is depicted of a UCD 106 in which one embodiment of the present disclosure can be implemented. UCD 106 can be implemented generally as shown, or the elements described with respect to FIG. 2 can be considered as a functional description of the various features which may be present in a computing device or multiple computing devices. As is known by those of ordinary skill in the art, items shown separately can be combined, and some items shown as integrated can be separated. In general, UCD 106 includes one or more processors 412 such as one or more central processing units (CPUs), an input/output interface 414, support circuitry 416, a display 418, and an input device 420 such as a remote control, keyboard, mouse, pointer, motion sensor, microphone and/or camera. Note that while UCD 106 is depicted with input device 418, control can alternatively be accomplished over the input/output interface 412, for instance, where the UCD 106 is connected to network 108 and control operations occur on another associated computer. The processor 412, input/output interface 414, support circuitry 416, display 418 and input device 420, are shown connected to a bus 422 which also connects to a computer-readable medium 424, referred to herein as memory 424. Memory 424 generally includes program storage memory 426 and data storage memory 428. Program storage memory 426 and data storage memory 428 can each comprise volatile (RAM) and non-volatile (ROM) memory units and can also comprise hard disk and backup storage capacity, and both program storage memory 426 and data storage memory 428 can be embodied in a single memory device or separated in plural memory devices.

Program storage memory 426 stores at least software program modules with instructions for execution by the one or more processors, and associated data, including one or more of an operating system, and other known modules for display of content from CDS 106 (not shown). The operating system generally includes procedures for managing one or more of memory, processes, software, hardware and/or network connections. Known modules that are typically included in program storage memory 426 are a typical closed captioning decoder for receiving closed captioning data and enabling presentation of that closed captioning data to a viewer, for example based on viewer selections. In accordance with embodiments herein, a secondary closed captioning decoding module 432 and a supplemental content module 433 are also provided. In certain implementations, the secondary closed captioning decoding module 432 is within an existing closed captioning decoder. In certain implementations, the secondary closed captioning decoding module 432 is separate from an existing closed captioning decoder. Secondary closed captioning decoding module 432 generally includes one or more software programs containing instructions stored in at least non-volatile memory of memory 424 including program storage memory 426, to scan data transmitted from the CDS 104, including the secondary closed captioning field to detect the presence of one or more supplemental content code(s). In certain implementations, the secondary closed captioning decoding module 432 can be referred to as a hash decoder, where supplemental content code(s) are hashes, for example, a string of numbers, letters, characters, or combinations thereof; each hash is unique to, and associated with, certain supplemental content. Supplemental content module 433 generally includes one or more software programs containing instructions stored in at least non-volatile memory of memory 424 including program storage memory 426, to present supplemental content, for instance on the display 418, and provide user interface to interact with the supplemental content.

Data storage memory 428 stores at least one or more sets of identity data 434 that contains, stored in at least non-volatile memory of memory 424 including data storage memory 428, data regarding identification information (e.g., one or more of Internet Protocol (IP) address, Media Access Control (MAC) address, username) and optionally other information such as credentials (e.g., password or biometric credentials) that are particular to the UCD 106. In certain embodiments, historical viewing information can also be stored in at least non-volatile memory of memory 424 including data storage memory 428 (such as what primary content was viewed, what secondary content was viewed and for how long). In certain embodiments, user-selected permissions can also be stored in at least non-volatile memory of memory 424 including data storage memory 428 (such as options to automatically enable viewing of supplemental content, or whether a viewer is granted an option to select to view supplemental content or ignore it when a supplemental content code is received). In certain embodiments, user data for financial transactions can also be stored in at least non-volatile memory of memory 424 including data storage memory 428 (such as banking or credit card information).

Secondary closed captioning decoding module 432 generally includes one or more software programs adapted to scan closed captioning data received from the CDS 104 for the presence of one or more corresponding supplemental content code(s) in a secondary closed captioning field. The supplemental content code(s) can be provided as a unique identifier associated with certain supplemental content stored at the SCS 102. For example, a unique identifier can be in the form of a hash containing a random string (e.g., 10-1000) of: characters (e.g., lowercase letters and/or uppercase letters), numerals, symbols, characters and numerals, characters and symbols, numerals and symbols, or characters, numerals and symbols. The field 2 trigger encoded as a hash can be, for example issued by the SCS 102 whenever supplemental content is uploaded to the supplemental content database 234. The module 432, for example operating as a hash decoder, scans broadcasted content, in particular the secondary captioning field of the closed captioning data associated with the broadcasted video content. For example, MPEG files contain DTVCC CTA-708 data embedded in therein including main and secondary caption fields. One or more hashes are embedded in the secondary caption fields, and when the hash decoder encounters such a hash, instructions are sent to the supplemental content module 433 to retrieve supplemental content from the SCS 102, and present said content in the UCD 106. In other embodiments, functionality of hash decoding and interacting with the SCS 102 can be carried out by a single module.

In certain embodiments, the UCD 106 includes a closed captioning decoder that is included within conventional UCDs, and contains a separate secondary closed captioning decoding module 432. In certain embodiments, functionality of the typical closed captioning decoder is modified to not only enable conversion of primary closed captioning data to present captions on-screen as is conventional, but also to convert or partially convert data in secondary fields, where the secondary closed captioning decoding module 432 is integral with, or interacts with, the closed captioning decoder to scan decoded secondary captions. In alternative embodiments, the secondary closed captioning decoding module 432 acts as a stand-alone module, to parse the incoming captioning data to identify supplemental content code(s). In further embodiments, processor resources on the UCD 106 can be preserved by engaging only the secondary closed captioning decoding module 432 when a user is not viewing the primary captions with the broadcasted content, i.e., the functionality of the typical closed captioning decoder to present text captions is not needed.

Supplemental content module 433 generally includes one or more software programs adapted to interact with the SCS 102. For example, the supplemental content module 433 contains instructions to transmit a signal to SCS 102 including supplemental content code(s), receive supplemental content transmitted from SCS 102, and present to the viewer the received supplemental content by way of a transmitted file or by directly opening a URL comprising the supplemental content. In certain implementations, supplemental content module 433 also includes one or more software programs containing instructions to directly display the supplemental content on display 418. The supplemental content can be presented to the viewer when supplemental content code(s) are detected by secondary closed captioning decoding module 432.

In certain implementations, supplemental content module 433 also includes one or more software programs adapted to present a user interface to the viewer, for example on the display 418, with one or more links such as card links in the video stream, for selection by the viewer of one or more supplemental content files and/or URLs comprising the supplemental content. In certain implementations, supplemental content module 433 also includes one or more software programs adapted to present a user interface to the viewer, for example on the display 418, to allow a viewer to accept and/or select supplemental content for viewing. The user interface can be presented to the viewer when supplemental content code(s) are detected by secondary closed captioning decoding module 432.

In certain embodiments, the secondary closed captioning decoding module 432 and the supplemental content module 433 are enabled to run in the background, for example at firmware and/or operating system levels of the UCD 106. In certain embodiments, one or both of the secondary closed captioning decoding module 432 and the supplemental content module 433 are included in a smart television purchased by a consumer (e.g., "out of the box"). In certain embodiments, one or both of the secondary closed captioning decoding module 432 and the supplemental content module 433 are included in an add-on streaming device coupled to a display. In certain embodiments, one or both of the secondary closed captioning decoding module 432 and the supplemental content module 433 are installed by a user to a smart television as a UCD 106, and/or on an add-on streaming device coupled to a display. In certain embodiments the secondary closed captioning decoding module 432 (e.g., a hash decoder constantly running in the background) receives and scans MPEG data from the CDS 104 for supplemental content codes (e.g., hashes); when a supplemental content code is detected, the supplemental content module 433 communicates with the SCS 102 to retrieve supplemental content, and formats said content for presentation to a user of the UCD 106. The supplemental content module 433 contains, for example, instructions to present a user interface to the user (for example that is not controlled by the specific supplemental content itself, as fixed graphics that are not interactive), and interactive supplemental content associated with the identified supplemental content code.

Secondary closed caption data is added to the closed captioning stream. For example, in a given broadcast program, certain supplemental content is associated with the broadcast and one or more corresponding supplemental content code(s) are encoded in a secondary closed captioning field of the broadcast. This act can be carried out by an entity that adds the primary closed captioning text. In situations in which the secondary closed captioning field of the broadcast is used, for instance with captioning text in a secondary language, one or more corresponding supplemental content code(s) can also be added within that secondary field. The one or more corresponding supplemental content code(s) can be provided at pre-selected time codes of the broadcast, for example associated with product placement, user participation, or other activity. In certain embodiments the one or more corresponding supplemental content code(s) are pre-created and included with the broadcast package, including the primary and secondary captions. In certain embodiments the one or more corresponding supplemental content code(s) are created in real time, for example associate with a live news broadcast, entertainment broadcast, or sporting event broadcast.

In certain embodiments, the content of the secondary closed captioning fields is co-transmitted with the video content in a format that is agnostic of the broadcast video format, as is the case with the primary closed captioning data, and any transcoding of the video content, for example by the CDS 104, is required to maintain the closed captioning. In certain embodiments, permissions to modify or add content in the secondary closed captioning fields is restricted to those entities with permissions to modify or add content in the primary closed captioning fields. In certain embodiments, permissions to modify or add content in the secondary closed captioning fields is not restricted to those entities with permissions to modify or add content in the primary closed captioning fields, so that third parties can modify or add content in the secondary closed captioning fields.

In certain implementations, one or more supplemental content codes can be inserted in the secondary closed caption stream in real time by the live captioner for live events or in post-production for other broadcasts. Automated workflows such as those commercially available from Telestream, LLC under the tradename Vantage be used to add one or more supplemental content codes in secondary closed captions in post-production, in addition to primary captioning inherent to the source media master. A post producer can be provided with the one or more supplemental content codes and insert them into the secondary closed caption stream while generating the primary captions. In other implementations, digital workflow can also be routed to the SCS 102 or another server, so that media that is ready for broadcast is update their video with one or more supplemental content codes in the secondary caption stream.

In one implementation, when the secondary closed captioning decoding module encounters a supplemental content code in a secondary closed captioning field, the viewer is prompted of the availability of supplemental content. In certain implementations, the supplemental content can automatically be presented to the viewer. In certain implementations, the viewer is provided a user interface, for example with a prompt to make a decision as to whether to be presented with supplemental content. The prompt can be in the form of a bar on the top, bottom, or side of the display, a window somewhere within the display, or as text or other visual content overlaying the display, where in all forms of the prompt maintains the primary video content. The user can choose to ignore the supplemental content, for instance by using the exit or return button on a typical remote control, or allowing for the passage of a predetermined amount of time, for instance, in the range of about 5-120 seconds.

In implementations of the system and method herein, the ability of a viewer to enable presentation of primary closed captioning data is unencumbered. This data need not be modified from the original intent of the content creator or the captioning creator so as to present codes to be parsed. Rather, the system and method herein enable scanning of secondary closed captioning data, which is largely unused (i.e., blank or null) and/or not presented for display to the viewer.

In certain implementations, the supplemental content presentation system can be integrated with a remote-control television. When secondary closed captioning decoding module determined the availability of supplemental content, certain existing commands on a typical remote control can automatically be converted to controls for the supplemental content. For example, many typical OEM remote controls that are used with smart televisions contain navigation arrows or other navigation controls used to make an on-screen selection.

Figure 5:
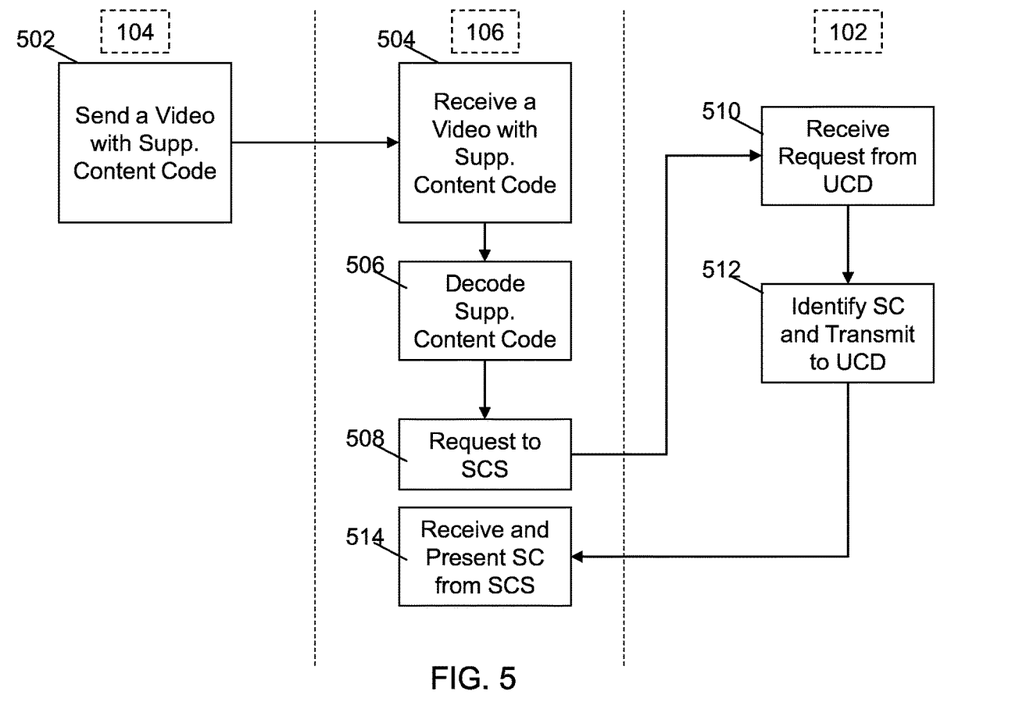
FIG. 5 is a schematic flow chart of a method in embodiments herein.

With reference to FIG. 5, and also with reference to elements described in the above FIGS. 1-4, a flow chart illustrating an overview of the process of presenting supplemental content based on secondary closed captioning encoding is provided. At step 502, a broadcaster sends, via the content distribution module 332 of the CDS 104, a video stream and associated closed captioning data, including a supplemental content code in a secondary closed captioning field that is stored in memory 334. For example, a MPEG-2 audio-video stream encoded with the supplemental content code in the secondary closed captioning field is broadcast from CDS 104. This broadcast can be over a network 108 via connectivity 109 and/or via a video content network 105. As described herein, supplemental content code, or hashes, are inserted in one or more secondary closed captioning fields of a video stream. For example, MPEG-2 video streams having closed captioning fields are encoded by adding hashes in the secondary closed captioning fields (which are not displayed when closed captioning is enabled by a viewer unless specifically selected by the user). At the SCS 102, those hashes are associated with certain supplemental content in the supplemental content database 234. At step 504, the UCD 106 receives and displays the video stream as is typical, which is complemented according to the system and method herein with the supplemental content code in the secondary closed captioning field. At step 506, the module 432 described herein scans the secondary closed captioning field for a supplemental content code, for example wherein the supplemental content code is a hash and the module 432 as a hash decoder. At step 508, when a supplemental content code is encountered by the module 432, a request is sent over network 108 via connectivity 109 from the UCD 106 (a requesting UCD) to the SCS 102 to access supplemental content. In certain embodiments the request sent at step 508 includes the supplemental content code and identification information related to requesting UCD 106, such as an IP address, MAC address or username, and optionally additional credentials, as described herein. At the SCS 102, the supplemental content database 234 stored in memory 224 is accessed to retrieve supplemental content, which is transmitted over network 108 via connectivity 109 to the requesting UCD 106, at step 512. The UCD 106 receives the supplemental content and renders it to the user at step 514, for example with module 433 described herein, via an interactive user interface.

Figure 6A:
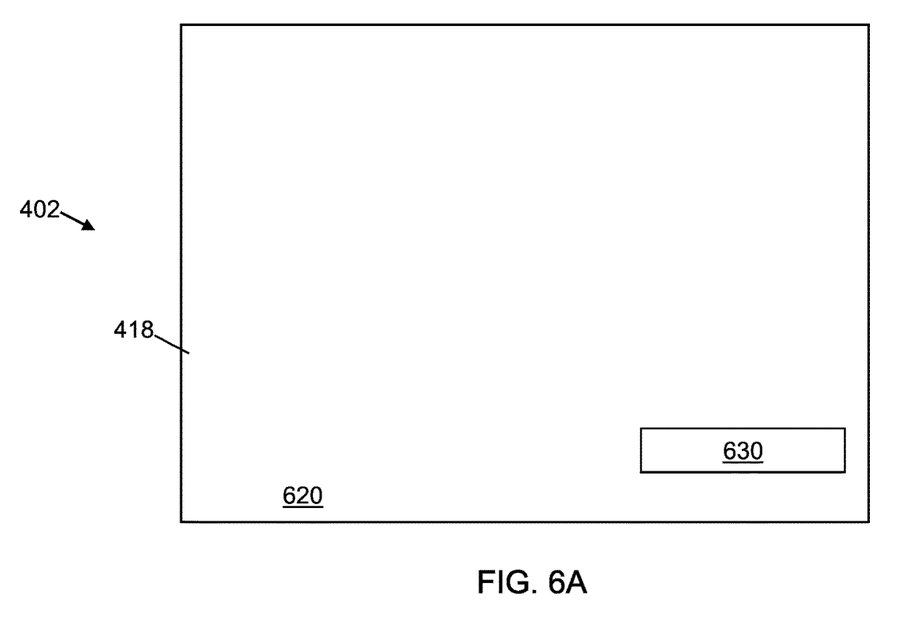
FIGS. 6A-6D are exemplary screenshots in embodiments herein.
Figure 6B:
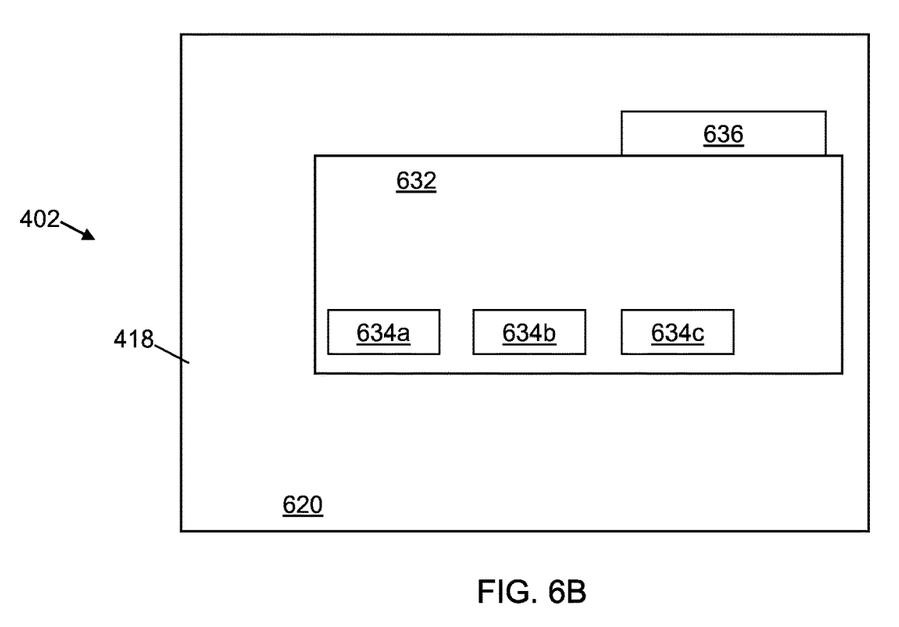
Figure 6C:
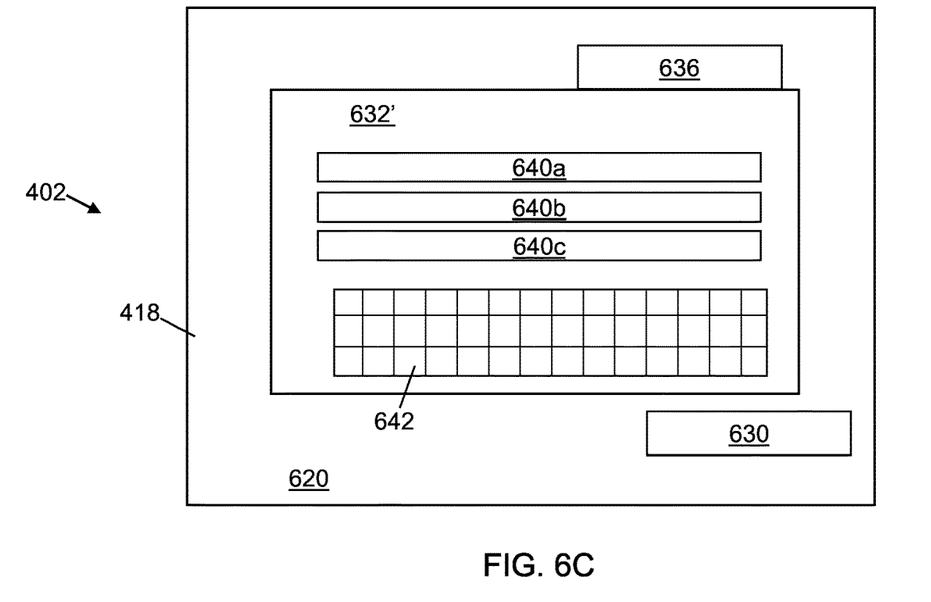
Figure 6D:
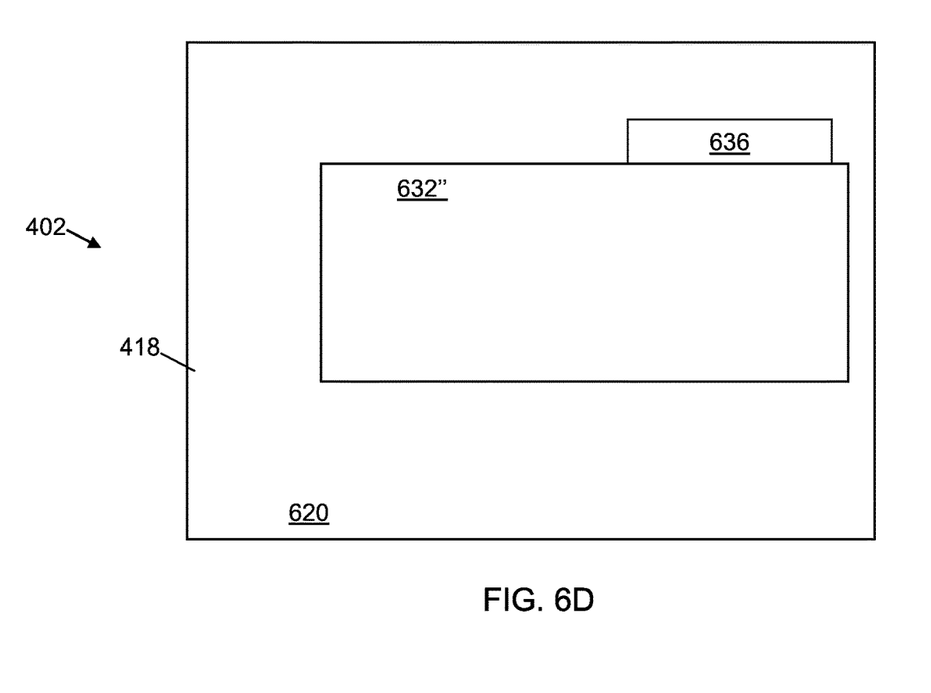

Referring to FIGS. 6A-6D, example screen views displayed on the UCD 106 are provided when the interactive content is available and presented to a viewer. The figures generally show a display 418 of a UCD 402, where broadcasted content is represented by 620. As shown in FIG. 6A, when a supplemental content code is encountered by the secondary closed captioning decoding module 432, supplemental content code decoder, a prompt 630 (e.g., a "button" on screen that user can point to with a remote control or other pointer device to make a selection, or call to action) is presented on the display 418, for example overlaying the main broadcast content 620. The prompt 630 is generally under control and instructions from the supplemental content module 433 described herein. As shown the prompt 630 is overlayed with the broadcast content 620, but it can be alternatively located on a top, bottom or side bar. Further, a prompt can be in the form of a sound that the user responds to in order to trigger the presentation of supplemental content. The user can select the prompt 630 (or make a selection to present supplemental content by another method such as voice, described herein) and, with reference to FIGS. 6B-6D, view supplemental content 632, 632' or 632", generally under control and instructions from the supplemental content module 433 described herein, with data for the supplemental content provided by SCS 102. As shown the supplemental content 632, 632' or 632" is in a window overlayed with the broadcast content 620, but it can be alternatively located on a top, bottom or side bar. Referring to FIG. 6B, a supplemental content window 632 can contain, for example, one or more prompts to call to action viewing of additional supplemental content, represented as buttons 634a, 634b and 634c. In addition, a navigation prompt can be provided to exit the supplemental content and return to standard broadcast viewing, for example in the form of a button 636. With reference to FIG. 6C, in certain embodiments or modes of implementation, a supplemental content window 632' can be provided with the functionality for a user to enter text, for instance in one or more input boxes 640a, 640b and 640c, for example using an on-screen keyboard 642. With reference to FIG. 6D, in certain embodiments or modes of implementation, a supplemental content window 632" can be provided without any additional prompts or inputs from the viewer that are added under control and instructions from the supplemental content module 433 described herein, for example a video stream, images, text data, or an external web page (in which interactivity is outside of the control of the supplemental content module 433 described herein).

The terminology used herein is for the purpose of describing particular embodiments or implementations only and is not intended to be limiting of the disclosure. Terms of orientation are used herein merely for purposes of convention and referencing and are not to be construed as limiting.

As used herein, "user" and "viewer" can be presented interchangeably, and refer to an individual, group of individuals or entity that is viewing content on a UCD 106.

As used herein, "primary content" means content that is consumed by viewers, and can include but is not limited to broadcast primary content and stored primary content. In certain embodiments herein, primary content including broadcast primary content is distributed by a CDS 104. Broadcast primary content can include but is not limited to broadcast streaming content, e.g., typical programming on selected channels that is broadcast to all viewers simultaneously, and/or on-demand content that is selected by individual viewers. This includes but is not limited to all content that is provided by an over the air broadcaster, a cable/satellite television provider and/or streaming content provider. Stored primary content includes but is not limited to video content that is stored on a UCD 106 or other media directly in possession of the user, such as USB flash drives, external magnetic drives, external SSD drives, and/or optical storage media (including but not limited to Blu-ray or DVD media)

As used herein, "closed captioning" and its alternative forms including "closed caption" and "closed captioned" means caption text displayed to viewers based on a viewer selection. The text is typically a transcription of the audio portion and optionally descriptive text of a program. The viewer must overtly choose to decode or activate closed captions in order to view them. Closed captions are typically created by the content creator, the broadcaster of the content, or a third-party captioning company. Closed captions can be created with pre-recorded video content to provide transcription in time with the video content, or added in real time or with a slight delay during live streaming video content. In certain implementations closed captions including secondary closed captions are embedded in MPEG picture user data. The technical format for the closed captioning that is embedded in the video content can include, for example, CTA-608, CTA-708, action message format (AMF) on Text-Data events, motion pictures expert group (MPEG)-4 part 17, 3rd generation partnership project (3GPP) timed text, digital video broadcasting (DVB) subtitling, sistema brasileiro de televisao digital (SBTVD), digital terrestrial multimedia broadcast (DTMB), or world system teletext (WST). The file formats may include, but are not limited to, scenarist closed captioning (SCC), timed text markup language (TTML), distributed format exchange profile (DFXP), society of motion picture and television engineers (SMPTE) timed text (SMPTE-TT), web video text tracks (WebVTT), SubRip (SRT), synchronized accessible media interchange (SAMI), European broadcasting union (EBU)-STL, or EBU timed text (EBU-TT). In certain embodiments, closed captioning can be created in one format and converted to another format. For example, captions created with the CTA-608 standards can be upconverted to CTA-708 standards. In certain embodiments, closed captions are implemented as DTVCC CTA-708 data (and optionally CTA-608 data that is upconverted) which is embedded in the MPEG (e.g., MPEG-2) video streams in the picture user data, using the DTVCC Transport Stream as a fixed-bandwidth channel with is space allocated for both CTA-608 line 21 captions and DTVCC, with 960 bit/s allocated for backwards compatibility with CTA-608 line 21 captions and 8640 bit/s allocated for DTVCC CTA-708 captions.

As used herein, "secondary closed captioning data" means data presented in a secondary captioning field of a closed captioning system, including those embedded in video distribution formats including but not limited to NTSC formats, ATSC formats, Internet broadcast formats or another suitable format. In one implementation, secondary closed captioning data means CTA-608 secondary captions, for example known as "line 21, field 2 captions" "line 284" or "CC2, CC3 and CC4 captions" (where CC1 is used as is known for a primary language caption). In one implementation, secondary closed captioning data means CTA-708 secondary captions, for example known as "CS2, CS3, CS4, CS5, CS6 . . . captions" (where CS1 is used as is known for a primary language caption).

As used herein, "supplemental content" means content that is added by the system and process of the present disclosure and is distributed by SCS 102 (for example with content request processing module 232 described herein) or another system such as the CDS 104 including a module with content request processing functionality. The content type of the supplemental content includes but is not limited to web page files, image files, video content, documents, audio/video recordings, metadata and other information, and/or links to any of said content types. The formats for the supplemental content included but is not limited to HTML, CSS, Java and other web-based languages.

The terms "computer," "computer system" or "computing device" as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application as is known in the art.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, a Public Switched Telephone Network (PSTN), a Private Branch Exchange (PBX), a Mobile Telephone Service (MST), a Satellite Telephone Service (STS), a serial line interface protocol/point-to-point protocol (SLIPP/PPP), an integrated services digital network (ISDN), a dedicated leased-line service, broadband (cable) access, digital subscriber line (DSL), asynchronous transfer mode (ATM), or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP, etc.

The term "video content network," as used in this disclosure, means any communication system or methodology for distributing video content. This can include but is not limited to subscription-based and non-subscription-based video content. The mode of transmission can include but is not limited to a television broadcasting system, a satellite broadcasting system, a radio broadcasting system, a publishing system, a streaming service, the Internet, any other network as defined herein, or any other media that can render, reproduce, transmit, or otherwise make available a portion of video content. In the example implementation herein, the video content network can be the same network as that through which UCD 106 and SCS 102 are communicatively coupled.

The term "server," as used in this disclosure, means any combination of software and/or hardware, including at least one application and/or at least one computer to perform services for connected clients as part of a client-server architecture. The at least one server application can include, but is not limited to, for example, an application program that can accept requests from user computing devices for supplemental content and that can transmit responses to the user computing devices. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The terms "transmission" or "transmit" as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

The term "computer-readable medium," as used in this disclosure, means any tangible non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers. Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, Bluetooth, or the like.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

As used herein, the singular forms "a," "an" and "the" are intended to include the plural forms as well, unless the context clearly indicates otherwise. The terms "including," "comprising" and variations thereof, as used in this disclosure, mean "including, but not limited to," unless expressly specified otherwise. When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

The invention claimed is:

1. A method comprising:
   providing a user computing device including at least a display, a secondary closed captioning decoding module, a supplemental content module, and network connectivity;
   receiving at the user computing device broadcasted video content and associated closed captioning data, wherein the closed captioning data includes a secondary captioning field, and wherein a supplemental content code that is associated with the broadcasted video content is encoded in the secondary captioning field;
   decoding the supplemental content code with the secondary closed captioning decoding module;
   transmitting the supplemental content code via the network connectivity to a supplemental content server, receiving the supplemental content code at the supplemental content server, identifying supplemental content associated with the supplemental content code, and transmitting the supplemental content to the user computing device via the network connectivity; and
   presenting, on the display of the user computing device, the supplemental content or a link to the supplemental content under control of the supplemental content module.

2. The method as in claim 1, wherein the supplemental content code comprises a hash code that is unique to, and associated with, said supplemental content, and wherein the user computing device comprise a hash decoder that scans the secondary captioning field of the closed captioning data associated with the broadcasted video content.

3. The method as in claim 1, wherein the supplemental content comprises one or more of:
   a video stream stored at the supplemental content server;
   statistical data stored at the supplemental content server;
   a resource on an external webpage identified by a URL;
   an interactive voting or polling interface;
   a gaming interface;
   a wagering interface;
   an additional informational interface; and/or
   a shopping interface concerning products or services for purchase.

4. The method as in claim 1, wherein the broadcasted video content is under the Digital Television Closed Captioning (DTVCC) standard, and the closed captioning data is implemented as DTVCC CTA-708 data and/or CTA-608 data that is upconverted, further wherein the supplemental content code is encoded in the secondary captioning field of the CTA-708 data and/or CTA-608 data.

5. The method as in claim 1, wherein the closed captioning data includes primary closed captioning data that is not used by the secondary closed captioning decoding module and remains available for text presentation on the display of the user computing device by a closed captioning decoder.

6. The method as in claim 1, further comprising transmitting to the supplemental content server identification information pertaining to the user computing device.

7. The method as in claim 1, wherein the user computing device including at least the display, the secondary closed captioning decoding module, the supplemental content module, and the network connectivity comprises a smart television.

8. The method as in claim 2, wherein the supplemental content comprises one or more of:
- a video stream stored at the supplemental content server;
- statistical data stored at the supplemental content server;
- a resource on an external webpage identified by a URL;
- an interactive voting or polling interface;
- a gaming interface;
- a wagering interface;
- an additional informational interface; and/or
- a shopping interface concerning products or services for purchase.

9. The method as in claim 2, wherein the user computing device including at least the display, the secondary closed captioning decoding module, the supplemental content module, and the network connectivity comprises a smart television.

10. The method as in claim 8, wherein the broadcasted video content is under the Digital Television Closed Captioning (DTVCC) standard, and the closed captioning data is implemented as DTVCC CTA-708 data and/or CTA-608 data that is upconverted, further wherein the supplemental content code is encoded in the secondary captioning field of the CTA-708 data and/or CTA-608 data.

11. The method as in claim 10, wherein the closed captioning data includes primary closed captioning data that is not used by the secondary closed captioning decoding module and remains available for text presentation on the display of the user computing device by a closed captioning decoder.

12. The method as in claim 5, wherein the secondary closed captioning decoding module is integral with the closed captioning decoder.

13. The method as in claim 5, wherein the secondary closed captioning decoding module is unassociated with the closed captioning decoder.

14. The method as in claim 11, wherein the user computing device including at least the display, the secondary closed captioning decoding module, the supplemental content module, and the network connectivity comprises a smart television.

15. The method as in claim 6, further comprising transmitting to the supplemental content server information pertaining to duration of all or a portion of the interactive viewing session of the user computing device.

16. The method as in claim 6, further comprising transmitting to the supplemental content server information pertaining to user provided feedback.

17. The method as in claim 6, further comprising transmitting to the supplemental content server information pertaining to viewing information of the user computing device.

18. The method as in claim 15, further comprising transmitting to the supplemental content server information pertaining to user provided feedback.

19. A non-transitory computer storage medium encoded with a computer program, the program comprising instructions that when executed by at least one computing device cause the at least one computing device to perform operations for providing an interactive viewing session to a user computing device, the operations comprising:
- receiving, by at least one user computing device including at least a display, a secondary closed captioning decoding module, a supplemental content module, and network connectivity, broadcasted video content and associated closed captioning data, wherein the closed captioning data includes a secondary captioning field, and wherein a supplemental content code that is associated with the broadcasted video content is encoded in the secondary captioning field;
- decoding, by the at least one user computing device, the supplemental content code with the secondary closed captioning decoding module;
- transmitting, by the at least one user computing device, the supplemental content code via the network connectivity, to a supplemental content server, receiving the supplemental content code at the supplemental content server, identifying supplemental content associated with the supplemental content code, and transmitting the supplemental content to the user computing device via the network connectivity; and
- presenting, on the display of the user computing device, the supplemental content or a link to the supplemental content under control of the supplemental content module.

20. A computer-implemented system for providing an interactive viewing session to a user computing device, the system comprising:
- non-transitory processor readable media;
- at least user one computing device comprising at least one processor that is operatively coupled to the non-transitory processor readable media, wherein the non-transitory processor readable media have instructions that, when executed by the at least one processor, cause the at least one processor to perform the following steps:
- receiving, by the at least one user computing device including at least a display, a secondary closed captioning decoding module, a supplemental content module, and network connectivity, broadcasted video content and associated closed captioning data, wherein the closed captioning data includes a secondary captioning field, and wherein a supplemental content code that is associated with the broadcasted video content is encoded in the secondary captioning field;
- decoding, by the at least one user computing device, the supplemental content code with the secondary closed captioning decoding module;
- transmitting, by the at least one user computing device, the supplemental content code via the network connectivity, to a supplemental content server, receiving the supplemental content code at the supplemental content server, identifying supplemental content associated with the supplemental content code, and transmitting the supplemental content to the user computing device via the network connectivity; and
- presenting, on the display of the user computing device, the supplemental content or a link to the supplemental content under control of the supplemental content module.

* * * * *